UNITED STATES PATENT OFFICE 2,487,045

1,4-DIAMINO-2-HALOGENOANTHRAQUINONE COMPOUNDS

Joseph B. Dickey, Anthony Loria, and Edmund B. Towne, Rochester, N. Y., assignors to Eastman Kodak Company, Rochester, N. Y., a corporation of New Jersey No Drawing. Application February 27, 1947, Serial No. 731,424

6 Claims. (Cl. 260—380)

This invention relates to new anthraquinone compounds and their application to the art of coloring materials, especially textile materials, such as filaments, threads, yarns or fabrics (knitted or woven) comprising a cellulose carboxylic ester, in which ester the acid radical contains from 2 to 4 carbon atoms. For simplicity these esters will be referred to hereinafter as cellulose carboxylic esters. The compounds of the invention are also useful as intermediates for the preparation of other anthraquinone compounds.

It is an object of our invention to provide new anthraquinone compounds useful as dyes for the coloration of cellulose carboxylic ester textile materials. Another object is to provide a satisfactory process for the preparation of the anthraquinone compounds of the invention. A further object is to provide cellulose carboxylic ester textile materials colored with the anthraquinone compounds of the invention. A still further object is to provide anthraquinone compounds useful as intermediates for the preparation of other anthraquinone compounds.

The anthraquinone compounds of our invention have the general formula:

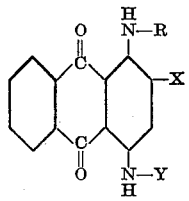

wherein R represents a hydrogen atom, an alkyl group containing 1 to 5 carbon atoms, a hydroxyalkyl group containing 2 to 5 carbon atoms, an alkoxyalkyl group containing 3 to 8 carbon atoms, a monohydroxyalkoxyalkyl group containing 4 to 6 carbon atoms and the tetrahydrofurfuryl group, X represents a halogen atom and Y represents a phenyl nucleus, which may carry substituents, such as a halogen atom, an acetamino group, a methyl group, a hydroxyl group, a methoxy group, an ethoxy group or a trifluoromethyl group, for example, having attached thereto a

—O—CH$_2$CHOHCH$_2$OH group or a

—(O—D)$_n$—O—R$_1$ group, wherein D represents an ethylene group, a propylene group or a trimethylene group, $n$ is a whole number from 1 to 3 and R$_1$ represents a hydrogen atom, a methyl group or an ethyl group and wherein said group —(O—D)$_n$—O—R$_1$ does not contain more than 9 carbon atoms.

The anthraquinone compounds of the invention yield blue, perhaps more properly, it should be stated greenish-blue, shades on cellulose carboxylic ester textile materials. At least one of the dyes described herein yields dyeings on cellulose acetate fabrics which, so far as we are aware, are the fastest to light and gas of any dyeings obtained on this material with a direct blue anthraquinone dye. The anthraquinone compounds of our invention are likewise of utility for the coloration of silk, wool and nylon textile materials coloring these materials blue shades.

The anthraquinone compounds of our invention are prepared by reacting an anthraquinone compound of the general formula:

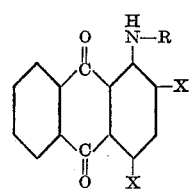

wherein R and X have the meaning previously assigned to them with an amine having the formula:

Y—NH$_2$ wherein Y has the meaning previously assigned to it. The reaction is ordinarily carried out in the presence of an inert organic diluent such as n-amyl alcohol, n-butyl alcohol or isopropyl alcohol and a copper salt catalyst such as finely powdered cupric sulfate or cupric acetate. The use of n-amyl alcohol has been found to be advantageous. Ordinarily an acid binding agent such as potassium acetate, sodium acetate, ammonium acetate, sodium bicarbonate, potassium bicarbonate, sodium carbonate or potassium carbonate, for example, is also present.

The following examples illustrate the compounds of our invention and their manner of preparation.

*Example 1.—1-amino-2-bromo-4-[2-β-{β-(β-hydroxyethoxy) ethoxy} ethoxyphenyl] aminoanthraquinone*

100 grams (0.26 mole) of 1-amino-2,4-dibromoanthraquinone, 79 grams (0.33 mole) of o-aminophenyl-β-hydroxy-β-ethoxy-β-ethoxyethyl ether

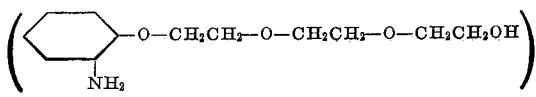

30 grams of potassium acetate and 3 grams of finely powdered copper sulfate ($CuSO_4.5H_2O$) are refluxed together, with stirring, in 500 cc. of n-amyl alcohol for seven hours. (The reaction is complete when a drop of the reaction mixture diluted with acetone is a pure blue when observed by daylight.) The dye is then isolated and purified by either of the following methods:

METHOD I

The reaction mixture is taken to dryness in vacuo on a steam bath. 800 grams of toluene are added, the reaction mixture heated to boiling, filtered hot, and the insoluble material washed with 160 grams of boiling toluene. The filtrate is cooled to 15° C. and 240 grams of petroleum ether is added over a five minute period with good stirring, cooling is continued until the temperature is 0°–5° C. and after 1 hour the dye is solid. This procedure may be repeated without decreasing the yield to any extent and should be repeated if the dye is gummy at this point. If the precipitation procedure is to be repeated the dye should be first heated to 50° C. for a few minutes to remove any residual petroleum ether that will hinder the solubility of the dye in toluene. The dye is recovered by filtration, washed with 160 grams of petroleum ether and dried at 40° C.–50° C. The dye obtained has the formula:

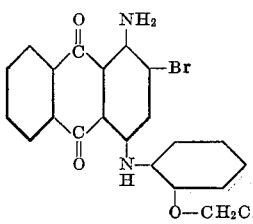

It has a melting point of 74° C.–75° C. The yield is 96 grams (68.5%).

METHOD II

The reaction mixture is filtered hot, the filtrate allowed to cool slowly overnight and filtered. (The filtrate is worked upon as described below.) The desired product is collected on the filter in excellent purity. It is washed with 200 cc. of petroleum ether and dried at 40° C.–50° C. It has a melting point of 80° C.–85° C. The yield is 56 grams.

The filtrate obtained above is treated just as the reaction mixture in Method I, using half the volume of solvents. The yield is 39 grams and the melting point is 74° C.–75° C. The total yield is 95 grams (68%).

The anthraquinone compound of this example has excellent affinity for cellulose acetate textile materials. It yields blue dyeings on cellulose acetate textile materials which are the fastest to light and by far the fastest to gas of any dyeings obtained on such materials with any of the direct blue anthraquinone dyes known to us.

*Example 2.—1-amino-2-chloro-4-[2-β-{β-(β-hydroxyethoxy) ethoxy} ethoxyphenyl] aminoanthraquinone*

This compound is prepared by using 76.4 grams of 1-amino-2,4-dichloroanthraquinone instead of 100 grams of 1-amino-2,4-dibromoanthraquinone in Example 1. The reaction product consisting essentially of 1-amino-2-chloro-4-[2-β-{β-(β-hydroxyethoxy) ethoxy} ethoxyphenyl] aminoanthraquinone possesses excellent affinity for cellulose acetate textile materials and yields dyeings on these materials which possesses excellent fastness to light and gas.

*Example 3.—1 - amino - 2 - chloro-4-[2-β-{β-(β-methoxyethoxy) ethoxy} ethoxyphenyl] aminoanthraquinone*

This compound is prepared by using 76.4 grams of 1-amino-2,4-dichloroanthraquinone instead of 100 grams of 1-amino-2,4-dibromoanthraquinone and 83.6 grams of o-aminophenyl-β-methoxy-β-ethoxy-β-ethoxyethyl ether instead of 79 grams of o - aminophenyl - β - hydroxy - β - ethoxy - β-ethoxyethyl ether in Example 1. It has the formula:

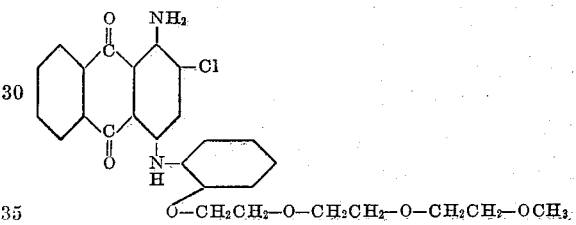

It possesses excellent affinity for cellulose acetate textile materials and yields dyeings on these materials which have excellent fastness to light and gas.

*Example 4.—1-amino-2-bromo-4-[4-β-{β-(β-hydroxyethoxy) ethoxy} ethoxyphenyl] aminoanthraquinone*

100 grams of 1- amino - 2,4 - dibromoanthraquinone, 79 grams of p-aminophenyl-β-hydroxy-β-ethoxy-β-ethoxyethyl ether, 30 grams of potassium acetate and 3 grams of finely powdered crystalline copper sulfate ($CuSO_4.5H_2O$) are refluxed together, with stirring, in 450 cc. of n-amyl alcohol until a drop of the reaction mixture diluted with acetone is a pure blue when observed by daylight. This requires about two to two and a half hours. The n-amyl alcohol is removed completely at reduced pressure in a water bath and the residual product is slurried in warm water and filtered. This dilution serves the purpose of removing the inorganic salts and the excess of amine. The weight of the air dried crude dye product is 134 grams out of a theoretical amount of 141 grams.

The crude dye is crystallized by dissolving it in boiling chlorobenzene (10 volumes per weight), filtering hot, cooling the filtrate and adding an equal volume of petroleum ether to precipitate the desired product which is a blue dye. The blue dye is recovered by filtration, washed with petroleum ether until the washings are no longer yellow and dried. A yield of 94–98 grams melting at 124° C.–127° C. is obtained.

*Example 5.—1-amino-2-bromo-4-[4-β-(β - hy - droxyethoxy) ethoxyphenyl] aminoanthraquinone*

3.81 grams of 1-amino-2,4-dibromoanthraquinone, 10 grams of p-aminophenyl-β-hydroxy-β- ethoxyethyl ether, 1 gram of potassium acetate and 1 gram of finely powdered cupric acetate are heated, with stirring, in 25 cc. of methyl carbitol for 8 hours at 120° C. and at 150° C. for 16 hours. The reaction mixture is cooled, added to a large volume of water, and filtered to recover the desired dye product. It is purified by crystallization from ethyl alcohol. It has the formula:

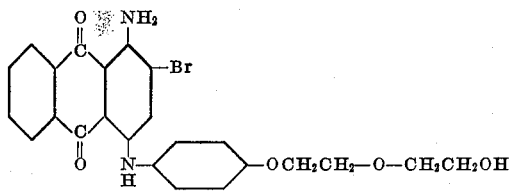

It possesses good affinity for cellulose acetate textile materials and yields dyeings on these materials which have good fastness to light and gas.

*Example 6.—1-amino-2-bromo-4-[4-β-(β-methoxyethoxy)ethoxyphenyl]aminoanthraquinone*

This compound is prepared by using 69.6 grams of p-aminophenyl-β-methoxy-β-ethoxyethyl ether instead of 79 grams of p-aminophenyl-β-hydroxy-β-ethoxy-β-ethoxyethyl ether in Example 4. It has the formula:

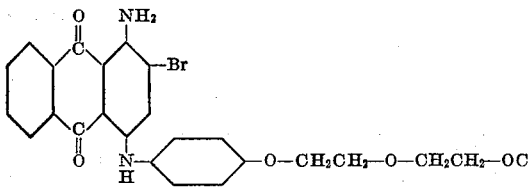

*Example 7.—1-amino-2-bromo-4-[4-β,γ-dihydroxypropoxyphenyl]aminoanthraquinone.*

This compound is prepared by using 60.4 grams of p-aminophenyl-β,γ-dihydroxypropyl ether instead of 79 grams of p-aminophenyl-β-hydroxy-β-ethoxy-β-ethoxyethyl ether in Example 4. It has the formula:

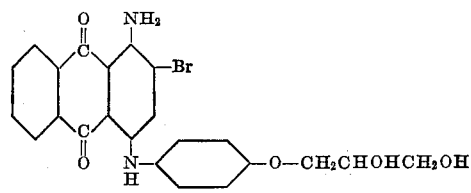

*Example 8.—1-amino-2-bromo-4-[4-β-{β-(β-hydroxyethoxy)ethoxy}ethoxyphenyl]aminoanthraquinone*

3.81 grams of 1-amino-2,4-dibromoanthraquinone, 1 gram of potassium acetate, 0.1 gram of finely powdered cupric acetate, 0.1 gram of finely powdered copper sulfate, 10 grams of p-aminophenyl-β-hydroxy-β-ethoxy-β-ethoxyethyl ether were refluxed together with the exclusion of air, with stirring, in 25 cc. of ethylene glycol diethyl ether for 3 hours. The solvent was allowed to evaporate overnight. Water was added to the residue which was then filtered to recover the desired product on the filter. It was purified by crystallization from chlorobenzene. A 58% yield was obtained in the first crop. Additional dye product can be obtained on further working up of the chlorobenzene mixture.

*Example 9.—1-methylamino-2-bromo-4-[2-β-{β-(β-hydroxyethoxy)ethoxy}ethoxyphenyl]aminoanthraquinone*

This compound is obtained by using 103.6 grams of 1-methylamino-2,4-dibromoanthraquinone instead of 100 grams of 1-amino-2,4-dibromoanthraquinone in Example 1.

Similarly by the use of 107.3 grams of 1-ethylamino-2,4-dibromoanthraquinone or 118.2 grams of 1-n-amylamino-2,4-dibromoanthraquinone instead of 100 grams of 1-amino-2,4-dibromoanthraquinone in Example 1, 1-ethylamino-2-bromo-4-[2-β-{β-(β-hydroxyethoxy)ethoxy}ethoxyphenyl]aminoanthraquinone, and 1-n-amylamino-2-bromo-4-[2-β-{β-(β-hydroxyethoxy)ethoxy-phenyl]ethoxy}aminoanthraquinone, respectively, are obtained.

*Example 10.—1-β-hydroxyethylamino-2-bromo-4-[2-β-(β-hydroxy-ethoxy)ethoxyphenyl]aminoanthraquinone*

This compound is prepared by using 111.0 grams of 1-β-hydroxyethylamino-2,4-dibromoanthraquinone instead of 100 grams of 1-amino-2,4-dibromoanthraquinone and 63.9 grams of o-aminophenyl-β-hydroxy-β-ethoxyethyl ether instead of 79 grams of o-aminophenyl-β-hydroxy-β-ethoxy-β-ethoxyethyl ether in Example 1.

*Example 11.—1-β-methoxyethylamino-2-bromo-4-[2-β-{β-(β-hydroxyethoxy)ethoxy}ethoxyphenyl]aminoanthraquinone*

This compound is prepared by using 115.0 grams of 1-β-methoxyethylamino-2,4-dibromoanthraquinone instead of 100 grams of 1-amino-2,4-dibromoanthraquinone in Example 1.

*Example 12.—1-β-(β-hydroxyethoxy)ethylamino-2-chloro-4-[4-β-(β-methoxyethoxy)ethoxyphenyl]aminoanthraquinone*

This compound is prepared by using 92.8 grams of 1-β-(β-hydroxyethoxy)ethylamino-2,4-dichloroanthraquinone instead of 100 grams of 1-amino-2,4-dibromoanthraquinone and 68.6 grams of p-aminophenyl-β-methoxy-β-ethoxyethyl ether instead of 79 grams of p-aminophenyl-β-hydroxy-β-ethoxy-β-ethoxyethyl ether in Example 4.

*Example 13.—1-tetrahydrofurfurylamino-2-bromo-4-[2-β-{β-(β-hydroxyethoxy)ethoxy}ethoxyphenyl]aminoanthraquinone*

This compound is prepared by using 122 grams of 1-tetrahydrofurfurylamino-2,4-dibromoanthraquinone instead of 100 grams of 1-amino-2,4-dibromoanthraquinone in Example 1. It has the formula:

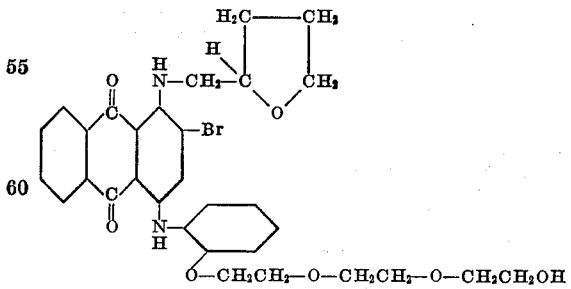

*Example 14.—1-amino-2-bromo-4-[4-β-{β-(β-methoxyethoxy)ethoxy}ethoxyphenyl]aminoanthraquinone*

2 grams of 1-amino-2,4-dibromoanthraquinone, and 1.7 grams of p-aminophenyl-β-methoxy-β-ethoxy-β-ethoxyethyl ether were heated together, with stirring, in 20 cc. of dry nitrobenzene at 130° C.–140° C. for 8 hours. No color change occurred. The reaction mixture was then heated to 150° C.–160° C. and maintained at this temperature, with stirring, for 8 hours. No color change occurred. The temperature of the reaction mixture was then raised to 185° C.–195° C. and the reaction mixture was maintained at this temperature, with stirring, for 24 hours. The reaction mixture turned bluish and finally blue indicating completion of the reaction.

As the reaction product was soluble in the nitrobenzene the reaction mixture was steam distilled to remove the nitrobenzene, following which it was filtered to recover the desired product. The reaction product consisting essentially of 1-amino-2-bromo-4-[4-β-{β-(β-methoxyethoxy) ethoxy} ethoxyphenyl] aminoanthraquinone melted at 95° C.–100° C.

This compound can also be prepared by reacting 1-amino - 2,4 - dibromoanthraquinone with p-aminophenyl-β-methoxy-β-ethoxy - β - ethoxy ether in accordance with the procedure described in Example 4.

*Example 15.—1-amino-2-bromo-4-[4-β-hydroxyethoxyphenyl]-amino-anthraquinone*

This compound is prepared by using 51 grams of p-aminophenyl-β-hydroxyethyl ether instead of 79 grams of p-aminophenyl-β-hydroxy-β-ethoxy-β-ethoxyethyl ether in Example 4.

*Example 16.—1-amino-2-bromo-4-[4γ - (γ - hydroxypropoxy) propoxyphenyl] aminoanthraquinone*

This compound is prepared by using 75 grams of p-aminophenyl - γ - hydroxy-γ-propoxypropyl ether

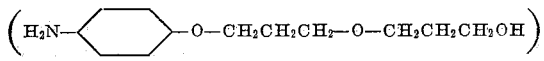

instead of 79 grams of p-aminophenyl-β-hydroxy-β-ethoxy-β-ethoxyethyl ether in Example 4.

*Example 17.—1-[2-{(1,3-dihydroxy - 2 - methyl) propyl} amino] - 2-bromo-4-[2-β-(β-hydroxyethoxy) ethoxyphenyl] aminoanthraquinone*

This compound is obtained by using 123 grams of 1-[2-{(1,3-dihydroxy-2-methyl)propyl} amino]-2,4-dibromoanthraquinone instead of 100 grams of 1-amino - 2,4 - dibromoanthraquinone and 63.9 grams of o-aminophenyl-β-hydroxy-β-ethoxyethyl ether instead of 79 grams of o-aminophenyl-β-hydroxy-β - ethoxy - β - ethoxyethyl ether in Example 1. It has the formula:

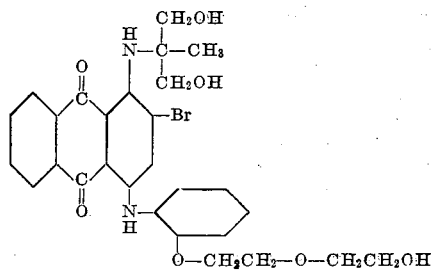

*Example 18.—1-amino-2-bromo-4-[4-β - {β-(β-ethoxyethoxy) ethoxy} ethoxyphenyl] aminoanthraquinone*

This compound is prepared by using 88 grams of p-amino-phenyl-β-ethoxy-β-ethoxy-β-ethoxyethyl ether instead of 79 grams of p-aminophenyl-β-hydroxy-β-ethoxy-β-ethoxyethyl ether in Example 4.

*Example 19.—1-β,γ-dihydroxypropyl-2-bromo-4-[2 - β - {β - (β - hydroxyethoxy) ethoxy} ethoxyphenyl] aminoanthraquinone*

This compound is prepared by using 119 grams of 1 - β,γ - dihydroxypropylamino - 2,4 - dibromoanthraquinone instead of 100 grams of 1-amino-2,4-dibromoanthraquinone in Example 1.

*Example 20.—1 - amino - 2 - bromo - 4 - [2-γ-{γ-(γ-hydroxypropoxy) propoxy} propoxyphenyl] aminoanthraquinone*

This compound is prepared by using 94 grams of o-amino-phenyl-γ-hydroxy-γ-propoxy-γ-propoxypropyl ether instead of 79 grams of o-aminophenyl-β-hydroxy-β-ethoxy-β-ethoxyethyl ether in Example 1.

*Example 21.—1-amino-2-fluoro-4-[2-β-{β-(β-hydroxyethoxy)ethoxy} ethoxyphenyl] aminoanthraquinone*

This compound is prepared by using 84 grams of 1-amino-2-fluoro-4-bromoanthraquinone instead of 100 grams of 1-amino-2,4-dibromoanthraquinone in Example 1. It gives greenish-blue dyeings on cellulose acetate textile materials which possess excellent fastness to light and gas.

*Example 22.—1-methylamino - 2 - fluoro-4-[2-β-(β - hydroxyethoxy) ethoxyphenyl] aminoanthraquinone*

This compound is prepared by using 88 grams of 1 - methylamino-2-fluoro-4-bromoanthraquinone instead of 100 grams of 1-amino-2,4-dibromoanthraquinone and 70 grams of o-aminophenyl - β - ethoxy-β-ethoxyethyl ether instead of 79 grams of o-aminophenyl-β-hydroxy-β-ethoxy-β-ethoxyethyl ether in Example 1. It yields greenish-blue dyeings on cellulose acetate textile materials which possess excellent fastness to light and gas.

Following the procedure described hereinbefore the compounds listed hereinafter are readily prepared:

1. 1 - β - hydroxyethylamino - 2-bromo-4-[4-β-(β-hydroxyethoxy) ethoxyphenyl] aminoanthraquinone 2. 1-β - methoxyethylamino - 2-bromo-4-[4-β-{β - (β - hydroxyethoxy) ethoxy} ethoxyphenyl] aminoanthraquinone 3. 1-β-(β-hydroxyethoxy) ethylamino - 2 - bromo-4-[4-β,γ-dihydroxypropoxyphenyl] aminoanthraquinone 4. 1 - ethylamino - 2 - bromo-4-[2-β-(β - methoxyethoxy) ethoxyphenyl] aminoanthraquinone 5. 1-amino - 2-bromo-4-[2-γ-(γ - hydroxypropoxy) propoxyphenyl] aminoanthraquinone 6. 1-amino - 2-chloro-4-[2-γ-(γ - methoxypropoxy) propoxyphenyl] aminoanthraquinone 7. 1-amino - 2-bromo-4-[2-β-(β - hydroxypropoxy) propoxyphenyl] aminoanthraquinone 8. 1 - amino - 2 - chloro - 4-[2-β-(β - ethoxypropoxy) propoxyphenyl] aminoanthraquinone 9. 1-γ-(γ-ethoxypropoxy) propylamino - 2-bromo - 4 - [4-β - (β - hydroxyethoxy) ethoxyphenyl] aminoanthraquinone 10. 1-tetrahydrofurfurylamino - 2-bromo-4-[2-β - (β - hydroxyethoxy) ethoxyphenyl] aminoanthraquinone 11. 1 - tetrahydrofurfurylamino - 2 - chloro-4-[4-β-(β-hydroxyethoxy) ethoxyphenyl] aminoanthraquinone 12. 1 - β-{β - (β-hydroxyethoxy) ethoxy} ethylamino-2-bromo - 4-[2-β - (β-hydroxyethoxy) ethoxyphenyl] aminoanthraquinone 13. 1 - amino - 2 - bromo-4-[2-chloro-4-{β-(β-hydroxyethoxy) ethoxy} phenyl] aminoanthraquinone 14. 1-methylamino - 2-chloro-4-[4-acetamino-2-{β-(β-ethoxyethoxy) ethoxy} phenyl] aminoanthraquinone 15. 1-methylamino - 2 - bromo-4-[2-methyl-4-{β-(β-hydroxyethoxy) ethoxy} phenyl] aminoanthraquinone 16. 1 - β - hydroxyethylamino - 2 - chloro-4-[2-methoxy - (4 - β,γ - dihydroxypropoxy) phenyl] aminoanthraquinone 17. 1-n-amylamino - 2-bromo-4-[2-hydroxy-4-{β-(β-hydroxyethoxy) ethoxy} phenyl] aminoanthraquinone 18. 1 - methylamino - 2 - bromo-4-[2-trifluoromethyl-4-{β-(β-(β-hydroxyethoxy) ethoxy) ethoxy} phenyl] aminoanthraquinone 19. 1-β-hydroxyethylamino - 2 - fluoro-4-[4-β-{β - (β - hydroxyethoxy) ethoxy} ethoxyphenyl] aminoanthraquinone 20. 1 - amino-2-fluoro - 4-[2-β - ethoxyethoxyphenyl] aminoanthraquinone In order that the preparation of the compounds of our invention may be entirely clear the preparation of various intermediate compounds used in their manufacture is described hereinafter.

*Preparation of 1-methylamino-2,4-dibromoanthraquinone*

23.7 grams of 1-methylaminoanthraquinone and 21.6 grams of potassium acetate are placed in 200 cc. of glacial acetic acid and the reaction mixture resulting is heated, with stirring, to 60° C. – 65° C. 35.5 grams of bromine in 30 cc. of glacial acetic acid are added slowly over a period of 1-2 hours while maintaining a reaction temperature of 60° C. – 65° C. The reaction mixture is maintained at 60° C. – 65° C. for 3-4 hours and then cooled and filtered. 1-methylamino-2,4-dibromoanthraquinone melting at 162° C. – 163° C. is obtained upon crystallizing the product recovered on the filter from glacial acetic acid. A good yield of the product in less pure form can be obtained by pouring the reaction mixture into 3 liters of cold water and filtering. By the use of 1-β-hydroxyethylaminoanthraquinone instead of 1-methylaminoanthraquinone in the foregoing example, 1-β-hydroxyethylamino-2,4-dibromoanthraquinone melting at 226° C. – 229° C. is obtained.

Compounds having the formula:

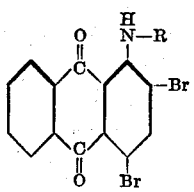

wherein R has the meaning previously assigned to it can be prepared by brominating a compound having the formula:

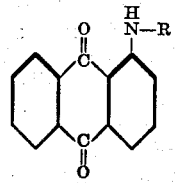

wherein R has the meaning previously assigned to it in accordance with the procedure described in connection with the preparation of 1-methylamino-2,4-dibromoanthraquinone. Thus, all the

2,4-dibromoanthraquinone compounds specifically disclosed in the examples as well as 1-n-propylamino-2,4 - dibromoanthraquinone, 1 - isopropylamino - 2,4 - dibromoanthraquinone, 1-n - butylamino-2,4-dibromoanthraquinone, 1-β-hydroxypropylamino-2,4-dibromoanthraquinone, 1 - epsilon-hydroxyamylamino - 2,4 - dibromoanthraquinone, 1-β-ethoxyethylamino-2,4-dibromoanthraquinone, 1-β-ethoxy-β-ethoxyethylamino-2,4-dibromoanthraquinone, 1-β-hydroxy-β-ethoxyethylamino - 2,4 - dibromoanthraquinone, 1 - β - hydroxy-β-ethoxy-β-ethoxyethylamino - 2,4-dibromoanthraquinone, 1 - γ - hydroxy-γ-propoxypropylamino - 2,4 - dibromoanthraquinone, 1-β - hydroxy-β-propoxy-β-propoxypropylamino - 2,4-dibromoanthraquinone and 1-β-n-butoxy - β - ethoxyethylamino - 2,4 - dibromoanthraquinone, for example, can be readily prepared.

Compounds having the general formula:

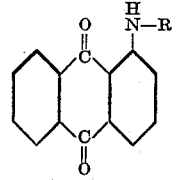

wherein R has the meaning previously assigned to it (other than hydrogen) can be prepared, for example, by reacting 1-chloroanthraquinone in a diluent medium inert under the reaction conditions employed with an alkylamine, a hydroxyalkylamine, an alkoxyalkylamine, a monohydroxyalkoxyalkylamine or tetrahydrofurfurylamine in the presense of cupric acetate. The manner of preparation of these aminoanthraquinone compounds will be apparent from the following:

*Preparation of 1-methylaminoanthraquinone*

122 grams of 1-chloroanthraquinone, 500 grams of pyridine, 148 grams of a 25% solution of methylamine in water and 1 gram of cupric acetate are heated together in a shaking autoclave at 130° C. for six hours. The autoclave is then cooled to room temperature and its contents poured into two liters of water. The reaction mixture is filtered, washed with water and dried. 1-methylaminoanthraquinone melting at 167° C. is obtained with a yield of about 95%.

Similarly, 1-ethylaminoanthraquinone (M. P. 123° C.–124° C.), 1-isopropylaminoanthraquinone (M. P. 187° C.–189° C.), 1-β-methoxyethylaminoanthraquinone (M. P. 162° C.–166° C.), 1-β,γ-dihydroxypropylaminoanthraquinone (M. P. 216°–218° C.), 1-β-hydroxyethylanthraquinone (M. P. 164°–165° C.), 1-n-propylaminoanthraquinone, 1-n-amylaminoanthraquinone, 1 - epsilon-hydroxyamylaminoanthraquinone, 1-β-ethoxyethylaminoanthraquinone, 1-β - ethoxy-β-ethoxyethylaminoanthraquinone, 1-β-hydroxy-β - ethoxyethylaminoanthraquinone, 1-β-hydroxy-β - ethoxy-β-ethoxyethylaminoanthraquinone, 1-β-hydroxy-β-propoxy - β-propoxypropylaminoanthraquinone and 1-tethrahydrofurfurylaminoanthraquinone, for example, can be readily prepared.

Compounds having the formula:

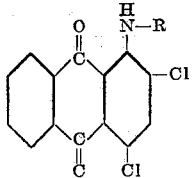

wherein R has the meaning previously assigned to it can be prepared by chlorinating a compound having the formula:

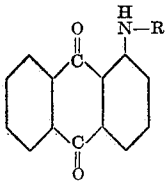

wherein R has the meaning previously assigned to it. The chlorination reaction is carried out using the same procedure as that described above in connection with the bromination of 1-methylaminoanthraquinone to obtain 1-methylamino-2,4-dibromoanthraquinone using chlorine instead of bromine. Thus 1-methylamino-2,4-dichloroanthraquinone, 1-β-hydroxyethylamino-2,4-dichloroanthraquinone, 1-n-propylamino-2,4 - dichloroanthraquinone, 1 - isopropylamino-2,4-dichloroanthraquinone, 1-n-butylamino-2,4 - dichloroanthraquinone etc., for example, can be so prepared.

1-methylamino-2,4-dibromoanthraquinone and 1-methylamino-2,4 - dichloroanthraquinone are disclosed in German Patent 164,791. The bromination and chlorination methods disclosed in this patent can be used to make the 1-amino-2,4-dichloroanthraquinone compounds and the 1-amino-2,4 - dibromoanthraquinone compounds used in the preparation of applicants' dye compounds.

1-amino-2-fluoro-4-bromoanthraquinone can be prepared by brominating 1-amino-2-fluoroanthraquinone. The bromination reaction is carried out as described in connection with the preparation of 1-methylamino - 2,4 - dibromoanthraquinone except that half the molecular amount of bromine is used.

Compounds of the formula:

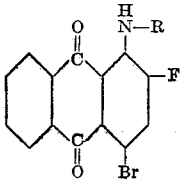

wherein R has the meaning previously assigned to it (other than hydrogen) can be prepared by diazotizing 1-amino-2-fluoroanthraquinone (in sulfuric acid for example) and obtaining 1-bromo-2-fluoroanthraquinone by treating the diazonium compound obtained with cuprous bromide (Gatterman reaction). The 1-bromo-2-fluoroanthraquinone compound thus obtained is in turn converted to compounds of the formula:

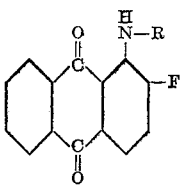

by reaction with an amine of the formula $H_2N$—R. (R in the last two formulas has the meaning mentioned immediately above.) The 1-amino-2-fluoroanthraquinone compounds obtained as just described are converted to the 1-amino-2-fluoro - 4 - bromoanthraquinone compounds having the formula given above by bromination with bromine in accordance with the procedure described in connection with the preparation of 1-methylamino-2,4-dibromoanthraquinone using of course the proper molecular amount of bromine.

Aniline derivatives of the formula:

$$H_2N—Q—(O—D)_n—O—R_1$$

wherein $n$, D and $R_1$ have the meaning previously assigned to them and Q represents a phenylene nucleus which may carry substituents such as a halogen atom, an acetamino group, a methyl group, a hydroxyl group, a methoxy group or a trifluoromethyl group can be prepared by condensing a chloronitrobenzene derivative of the following formula:

$$O_2N—Q—Cl$$

wherein Q has the meaning previously given to it with a sodium alcoholate of the following formula:

$$Na—(O—D)_n—O—R_1$$

wherein $n$, D and $R_1$ have the meaning previously given to them and then reducing the resulting nitro compound with hydrogen, in the presence of a nickel catalyst, especially of the Raney type, in methanol, at from 80° C. to 100° C. in an autoclave under a hydrogen pressure of 400 to 1800 pounds per square inch. The condensation of the chloronitrobenzene compound and the sodium alcoholate is advantageously carried out at 90° C. to 110° C. for about 20 hours. The condensation reaction is illustrated hereinafter with reference to the preparation of o-nitrophenyl-β-hydroxy-β-ethoxy-β-ethoxy-ethyl ether.

The sodium alcoholates can be prepared by adding sodium to the alcohols of the formula:

$$H—(O—D)_n—O—R_1$$

wherein $n$, D and $R_1$ have the meaning previously assigned to them. Many of these alcohols are very well known substances and readily available on the market, e. g. diethylene glycol and triethylene glycol and the monomethyl and monoethyl ethers of these glycols. Dipropylene glycol is also available on the market. Tripropylene glycol can be prepared by reacting 10 moles of dipropylene glycol with one mole of sodium and condensing the resulting mixture with one mole of propylene chlorohydrin ($CH_3CHOHCH_2Cl$). Ditrimethylene glycol can be prepared by reacting 10 moles of trimethylene glycol with one mole of sodium and condensing the resulting mixture with trimethylene chlorohydrin. Tri-trimethylene glycol can be prepared by reacting 10 moles of di-trimethylene glycol with one mole of sodium and condensing the resulting mixture with one mole of trimethylene chlorohydrin. The monomethyl and monoethyl ethers of di- and tri-propylene glycol and of di-trimethylene glycol and tri-trimethylene glycol can be prepared by reacting 5 to 10 moles of the glycol with sodium and condensing the resulting mixture with methyl iodide or ethyl iodide.

o-Nitrophenyl-β-hydroxy-β-ethoxy-β-ethoxy-ethyl ether

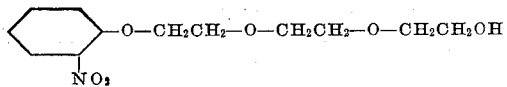

2635 g. of triethylene glycol (B. P. 141–143° C./4 mm.) are placed in a 5-liter 3-necked flask equipped with a mechanical stirrer, air condenser protected by a calcium chloride tube, a thermometer, and an addition tube for solids. Stirring is started and the temperature of the triethylene glycol raised to 90° C. The source of heat is then removed, and 101 g. of metallic sodium cut into ⅜" squares are added over a period of about two hours, keeping the temperature at 105–115° C.

When all the sodium has reacted, the flask is cooled to 85–90° C., and 693 g. of o-nitrochlorobenzene is added in 40–50 g. portions over a period of two hours, keeping the temperature at 100–110° C. The first few additions of o-nitrochlorobenzene usually cause vigorous reaction, but a noticeable rise in temperature should be observed with each addition, thus avoiding the danger of an accumulation of unreacted material with a consequent uncontrollable reaction later on. After this addition is complete, the reaction mixture is heated on a steam bath for about 16 hours with stirring.

The reaction mixture is then allowed to cool to 50–60° C. and is poured into 3.5 liters of water at room temperature. This relatively small amount of water thins out the reaction mixture and dissolves the salt without causing the product, which is a liquid at room temperature, to separate out appreciably. The o-nitrophenyl-β-hydroxy-β-ethoxyethyl ether is then extracted from the water-triethylene glycol mixture with four 1500 cc. portions of benzene. These combined benzene extracts are washed once with a small amount of water to remove any salt and the benzene removed by distillation. The yield of o-nitrophenyl-β-hydroxy-β-ethoxyethyl ether ranges from 913 to 1003 g. (76.5–84%). It is a viscous red-brown oil. When the nitro compound is to be reduced, only part of the benzene need be removed by distillation as the reduction can be carried out in benzene solution.

o-Aminophenyl-β-hydroxy-β-ethoxy-β-ethoxy-ethyl ether 457 gms. of o-nitrophenyl-β-hydroxy-β-ethoxy-β-ethoxyethyl ether prepared as described above were placed in a shaking autoclave together with 450 cc. of ethyl alcohol and 7.5 grams of Raney nickel. The reduction reaction was carried out with shaking at 90° C.–105° C. and 1500 lbs. per square inch hydrogen pressure. The reaction product from two runs as described above was filtered to remove the Raney nickel and the ethyl alcohol was removed by distillation. The desired product was then recovered by distilling the remainder of the reaction mixture under reduced pressure. The yield of product (B. P. 205° C.–210° C./3.5 mm.) was 648 grams or 80% of the theoretical.

Compounds of the formula:

wherein Q has the meaning previously assigned to it can be prepared by reacting the sodium salt form of a nitrophenol with glycerol chlorohydrin and reducing the nitro group in known fashion to an amino group, as with hydrogen, under pressure, in the presence of a Raney nickel type catalyst.

The anthraquinone dye compounds of our invention are primarily adapted for the coloration of cellulose carboxylic ester textile materials in which ester the acid radical contains from 2 to 4 carbon atoms. These esters include the hydrolyzed as well as the unhydrolyzed cellulose carboxylic esters such as cellulose acetate, cellulose propionate and cellulose butyrate and the hydrolyzed as well as the unhydrolyzed mixed carboxylic esters of cellulose, such as cellulose acetate-propionate and cellulose acetate-butyrate. Our new dye compounds are also useful for the coloration of cellulose ester and cellulose ether lacquers, as well as lacquers made from polyvinyl compounds. Our new dyes are of some use for the coloration of nylon textile materials as well as wool and silk textile materials.

The anthraquinone dye compounds of our invention may be advantageously directly applied to the material undergoing coloration in the form of an aqueous suspension which can be prepared by grinding the dye to a paste in the presence of a sulfonated oil, soap or other suitable dispersing agent and dispersing the resulting paste in water.

Direct dyeing operations can, with advantage, be conducted at temperatures of about 65–90° C. but any suitable temperature can be used. Thus the textile materials, such as cellulose acetate, for example, to be dyed or colored is ordinarily added to the dye bath at a temperature lower than that at which the main portion of the dyeing is to be effected, a temperature approximating 45–55° C., for example, following which the temperature is raised to that selected for carrying out the dyeing operation. The temperature at which the dyeing is conducted may, of course, be varied somewhat depending upon the particular material undergoing coloration. As is understood by those skilled in the art, the intensity of dyeing can be varied by varying the proportion of dye to material undergoing coloration. The amount of dye used can be, for example, ⅓% to 3% (by weight) of that of the textile material, although lesser or greater amounts of dye can be used.

In accordance with the recommendations of Chemical Abstracts, the term propylene is intended to mean the group having the following formula:

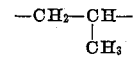

and the term trimethylene is intended to mean the group having the following formula:

We claim:
1. An anthraquinone compound having the general formula:

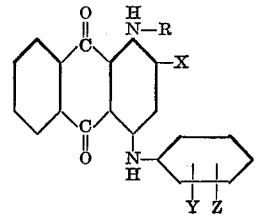

wherein R represents a member selected from the group consisting of a hydrogen atom, an alkyl group containing 1 to 5 carbon atoms, a hydroxyalkyl group containing 2 to 5 carbon atoms, an alkoxyalkyl group containing 3 to 8 carbon atoms, a monohydroxyalkoxyalkyl group containing 4 to 6 carbon atoms and the tetrahydrofurfuryl group, X represents a halogen atom having an atomic weight of from 19 to 80, Y represents a member selected from the group consisting of a $-O-CH_2CHOHCH_2OH$ group and a $$-(O-D)_n-O-R_1$$

group, wherein D represents a member selected from the group consisting of an ethylene group, a propylene group and a trimethylene group, $n$ is a whole number from 1 to 3 and $R_1$ represents a member selected from the group consisting of a hydrogen atom, a methyl group and an ethyl group and wherein said group $$-(O-D)_n-O-R_1$$

does not contain more than 9 carbon atoms, and Z represents a member selected from the group consisting of a hydrogen atom, a chlorine atom, a methyl group, a methoxy group, an ethoxy group, a hydroxyl group, an acetamino group and a trifluoromethyl group.

2. An anthraquinone compound having the general formula:

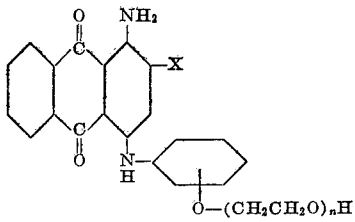

wherein X stands for a halogen atom having an atomic weight of from 19 to 80 and $n$ is a whole number from 1 to 3.

3. An anthraquinone compound having the general formula:

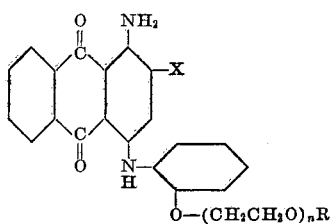

wherein X stands for a halogen atom having an atomic weight of from 19 to 80, $n$ is a whole number from 1 to 3 and R represents an alkyl group having 1 to 2 carbon atoms.

4. The anthraquinone compound having the formula:

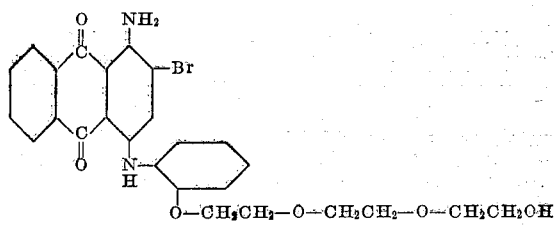

5. The anthraquinone compound having the formula:

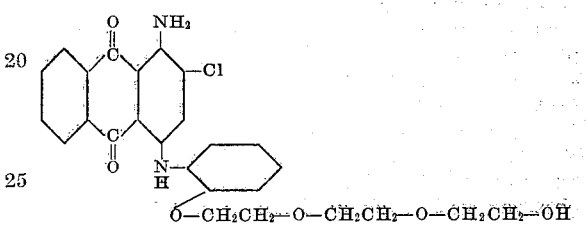

6. The anthraquinone compound having the formula:

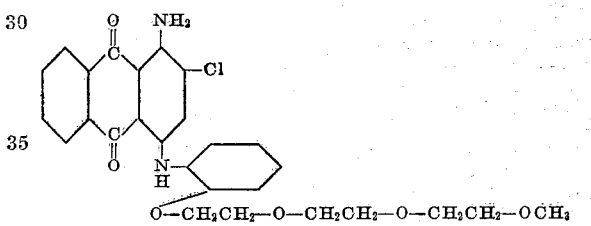

JOSEPH B. DICKEY.
ANTHONY LORIA.
EDMUND B. TOWNE.

REFERENCES CITED

The following references are of record in the file of this patent:

UNITED STATES PATENTS

| Number | Name | Date |
|---|---|---|
| 2,353,108 | Wuertz et al. | July 4, 1944 |

Certificate of Correction

Patent No. 2,487,045 November 8, 1949

JOSEPH B. DICKEY ET AL.

It is hereby certified that errors appear in the printed specification of the above numbered patent requiring correction as follows:

Column 3, line 58, for the word "upon" read *up*; column 6, line 11, for "hydroxyethoxy-" read *hydroxyethoxy*); column 10, line 65, for "hydroxyethylanthraquinone" read *hydroxyethylaminoanthraquinone*; column 11, lines 3 to 9, inclusive, for that portion of the formula reading

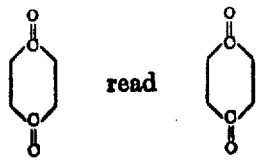

column 12, line 21, after "a methoxy group" insert , *an ethoxy group*;

and that the said Letters Patent should be read with these corrections therein that the same may conform to the record of the case in the Patent Office.

Signed and sealed this 28th day of March, A. D. 1950.

[SEAL]

THOMAS F. MURPHY,
*Assistant Commissioner of Patents.*